United States Patent [19]

Yokoi et al.

[11] Patent Number: 4,542,903
[45] Date of Patent: Sep. 24, 1985

[54] HAND-HELD GAME APPARATUS

[75] Inventors: Gunpei Yokoi, Kyoto; Satoru Okada, Osaka, both of Japan

[73] Assignee: Nintendo Co., Ltd., Kyoto, Japan

[21] Appl. No.: 452,212

[22] Filed: Dec. 22, 1982

[30] Foreign Application Priority Data

Dec. 28, 1981 [JP] Japan ................................ 56-214177

[51] Int. Cl.[4] ................................................ A63F 9/00
[52] U.S. Cl. ................................ 273/85 G; 273/1 GC; 273/1 E; 340/718; 340/784; 340/815.01
[58] Field of Search ................ 273/1 E, 1 GC, 85 G, 273/237; 340/718, 784, 815.01, 321, 717; 364/710, 708, 410; 40/497, 530; 368/82, 84, 239, 242

[56] References Cited

U.S. PATENT DOCUMENTS

| | | | |
|---|---|---|---|
| 1,791,616 | 2/1931 | Duclos | 40/497 |
| 3,492,486 | 1/1970 | Bischoff et al. | 40/361 |
| 3,800,730 | 4/1974 | Taylor | 340/321 |
| 3,940,758 | 2/1976 | Margolin | 340/711 |
| 4,110,792 | 8/1978 | Long et al. | 340/700 |
| 4,120,039 | 10/1978 | Fischer | 368/82 |
| 4,236,239 | 11/1980 | Imgruth et al. | 368/276 |

*Primary Examiner*—Richard C. Pinkham
*Assistant Examiner*—Leo P. Picard
*Attorney, Agent, or Firm*—W. G. Fasse; D. H. Kane, Jr.

[57] ABSTRACT

A hand-held game apparatus includes two housings (12, 14) coupled together in a foldable manner. Each housing is provided with a liquid crystal display panel (11, 13). Game characters which are able to move to different positions for playing a game are formed on the respective display panels (11, 13). There are two actuators on one housing for operation by a player. A control unit is housed in one of the housings and is able to control movements of the game characters on the respective panel (11, 13) in response to operation of the actuators (21, 22).

7 Claims, 32 Drawing Figures

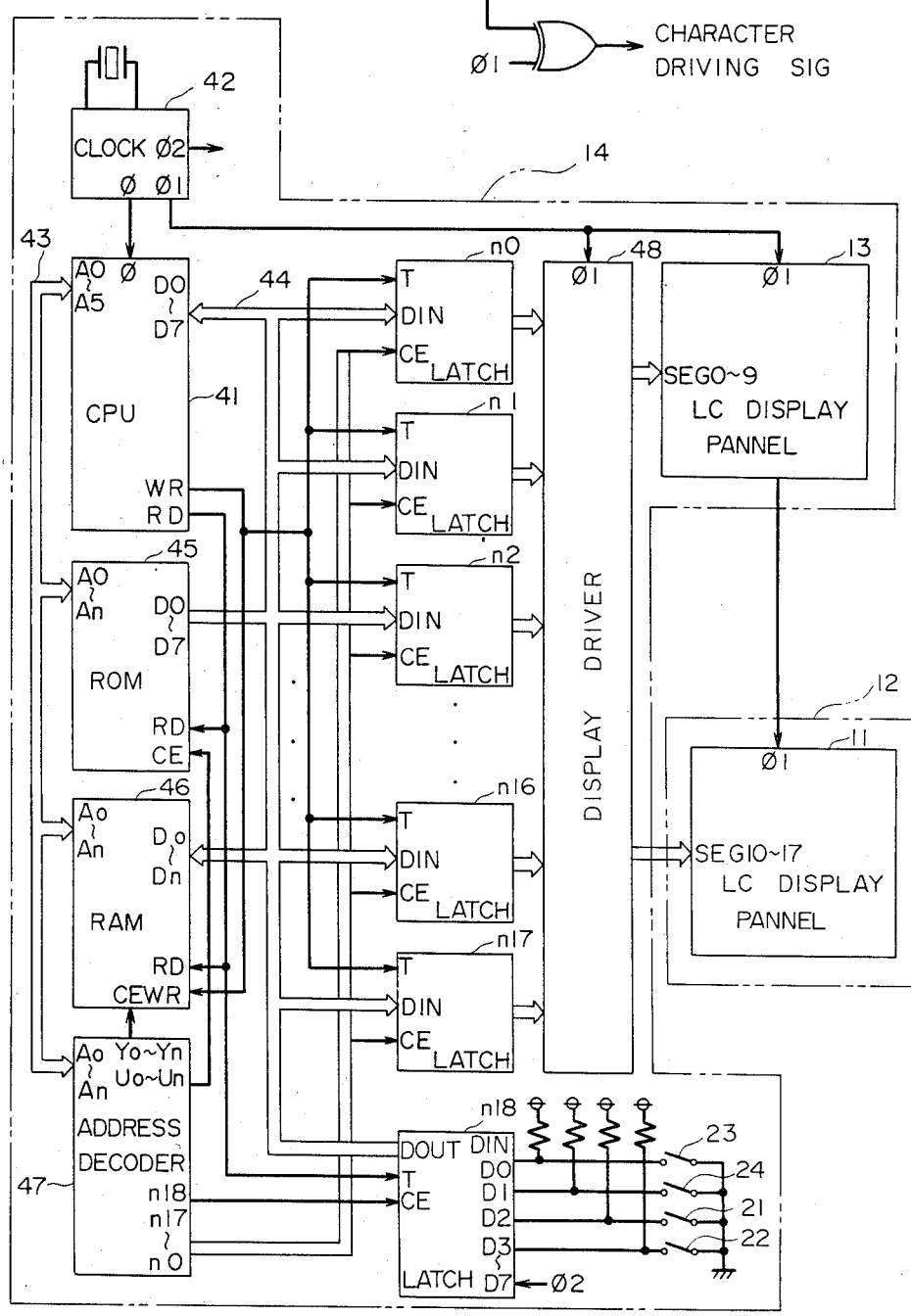
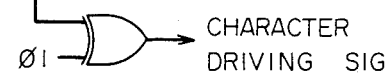
FIG. 4
FIG. 5

FIG. 6
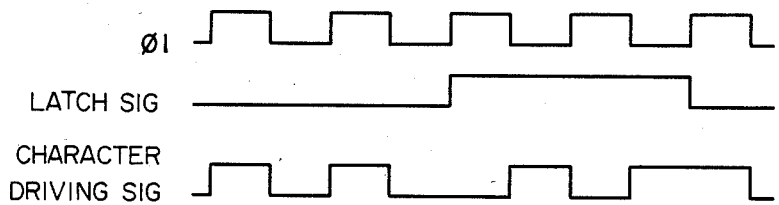
FIG. 7
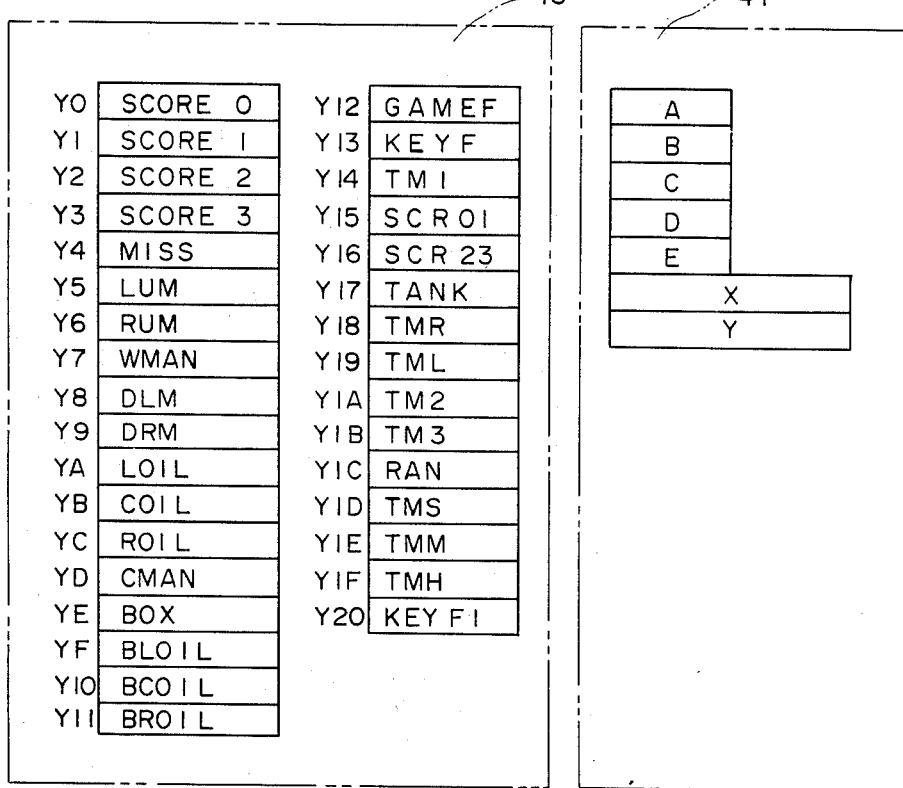
FIG. 9
| | 7 | 6 | 5 | 4 | 3 | 2 | 1 | 0 |
|---|---|---|---|---|---|---|---|---|
| GAMEF | | | | | W M | L DROP | R DROP | GAME OVER |
| KEYF | I sec | | | | TIME | L O N | R O N | GAME START |

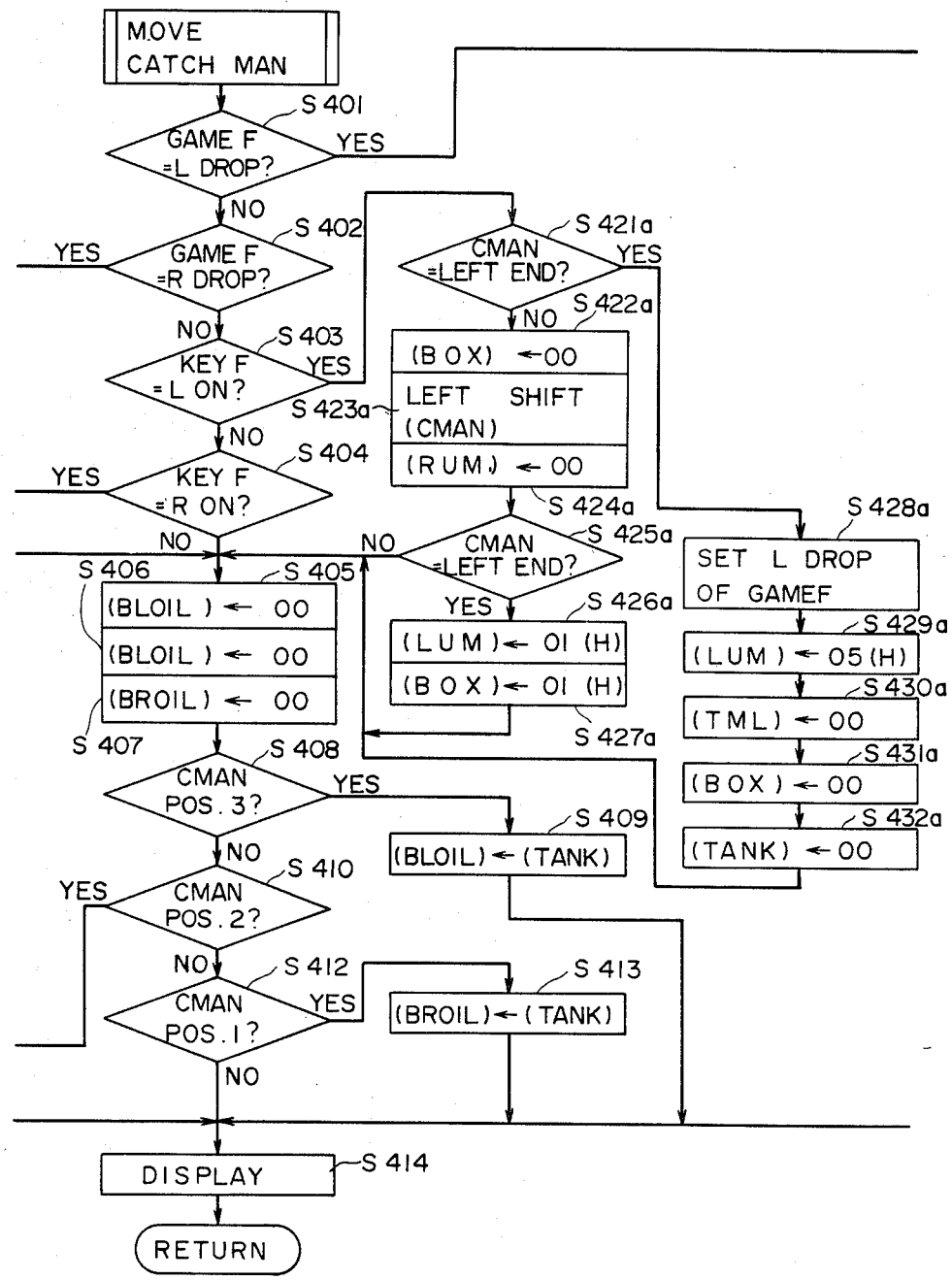

HAND-HELD GAME APPARATUS

BACKGROUND OF THE INVENTION

1. Field of the Invention

This invention relates to a hand-held game apparatus, and more particularly it relates to a hand-held game apparatus wherein characters on a display panel, for example, are movable for playing a game.

2. Description of the Prior Art

In a conventional hand-held game apparatus having a liquid crystal display panel, for example, there is provided only a single display panel on which game patterns are displayed. For the above type of hand-held game apparatus, it is desirable that it be as compact as possible. This requirement limits the size of the display area of the liquid crystal display panel. Accordingly, the conventional apparatus has the problem that game patterns must be displayed on a relatively small liquid crystal display panel whereby the number of various kinds of games is also limited.

SUMMARY OF THE INVENTION

It is therefore a primary object of the present invention to provide a hand-held game apparatus which is compact but permits the user to enjoy a wide range of different games.

Briefly, the present invention provides a hand-held game apparatus in which there are provided on respective ones of a plurality of foldably coupled supports for display panels with controllable character display positions. Especially one or more character display positions on the display panels are controlled in response to the actuation of at least one actuator means.

According to the present invention, it is possible to increase a display area where game patterns are displayed while the whole game apparatus remains small in size. Further, the present invention offers a remarkable number of various games as compared with conventional game apparatus.

These objects and other objects, features, aspects and advantages of the present invention will become more apparent from the following detailed description of the present invention when taken in conjunction with the accompanying drawings.

BRIEF DESCRIPTION OF DRAWINGS

FIG. 4 is a block diagram of the embodiment showing a control circuit for an present invention;

FIG. 5 is a diagram showing an internal construction of a display driver 48 as shown in FIG. 4;

FIG. 6 is a time chart showing pulse waveforms for explaining the operation of the display driver 48 as in FIG. 4;

FIG. 7 is an illustration of storage regions of a RAM 46 and a CPU 41 as shown in FIG. 4;

FIG. 9 is an illustration of bit structures of GAME and KEYF in FIG. 7;

DESCRIPTION OF THE PREFERRED EMBODIMENTS AND OF THE BEST MODE OF THE INVENTION

Figure 1:
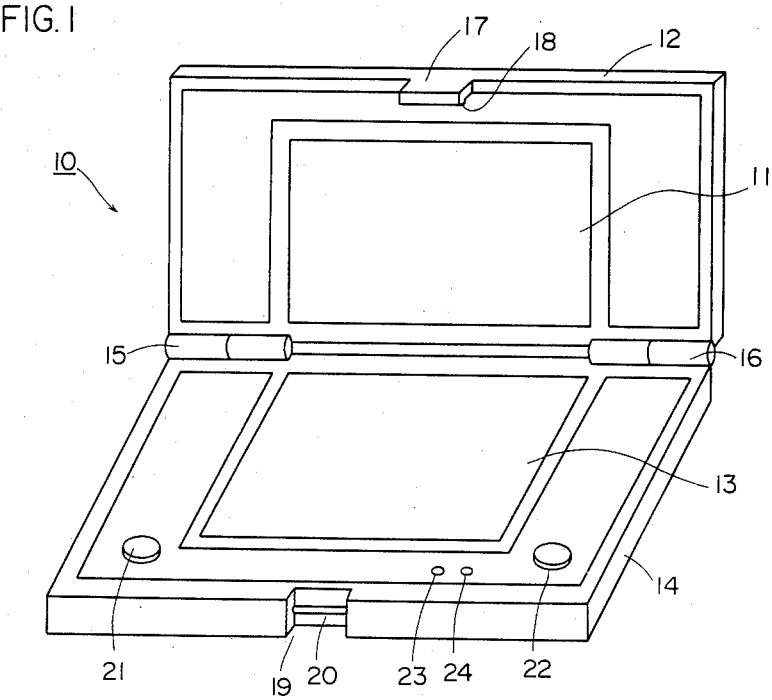
FIG. 1 is a perspective view showing the appearance of an embodiment of the present invention having two game display panels in one housing.
Figure 2:
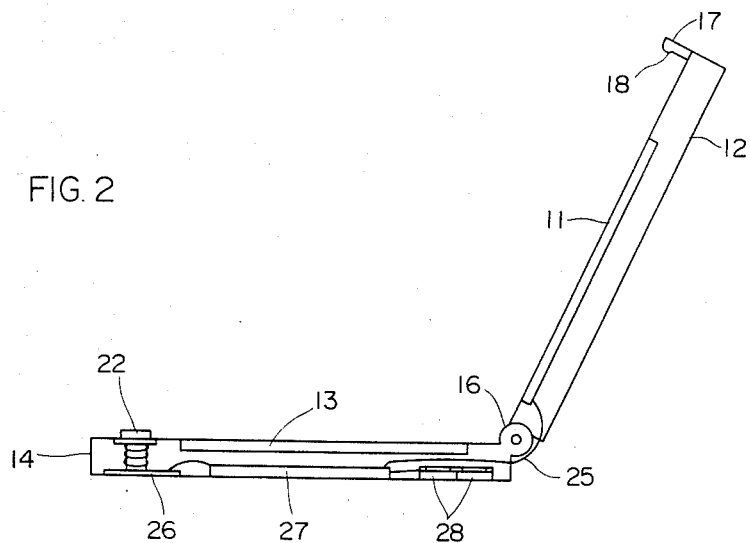
FIG. 2 is a cross sectional view of the embodiment of the present invention.

FIG. 1 is a perspective view of an embodiment of a hand-held game apparatus 10 of the present invention and FIG. 2 is a cross sectional view through the hand-held game apparatus as illustrated in FIG. 1. FIGS. 1 and 2 show the hand-held game apparatus 10 in its open state. The hand-held game apparatus 10 includes a first support or housing section 12 for accommodating a liquid crystal display panel 11 therein and a second support or housing section 14 for accommodating another liquid crystal display panel 13 therein. These housings 12 and 14 are coupled rotatably to each other by means of link hinge members 15 and 16, whereby the hand-held game apparatus 10 is foldable between an open or a closed position.

An ear 17 is formed at one side of the housing 12. The ear 17 has a stepped portion 18 on its inner side. One side of the housing 14, on the other hand, is formed with a cut-out 19 which receives the above mentioned ear 17 when the hand-held game apparatus 10 is folded into the closed position. One side surface of the cut-out 19 has a stepped portion 20 which engages the counterpart 18 in the ear 17. When the hand-held game apparatus 10 is folded, the stepped portions 18 and 20 are brought into engagement with each other to hold the housings 12 and 14 in folded, closed position. Especially FIG. 1 shows that the surface area of each display panel 11 and 13 is smaller than the surface area of the respective housing portion 12 and 14, whereby a frame is formed around each display panel. The frame-separates the display panels from each other especially along the hinge members 15, 16.

Character shift switches are provided on the housing 14 for moving desired characters on the liquid crystal display panel 13. The housing 14 is further provided with a start switch 23 for starting a game and a time switch 24 for updating the time of day to be displayed.

As shown in FIG. 2, a switch board 26 is disposed beneath the respective switches 21, 22, 23 and 24 inside the housing 14. This switch board 26 is connected to a control board 27 which is disposed inside the same housing 14. On the control board 27 there is formed a control circuit for controlling the displays for playing games and an updated time of day. Character enabling data from the control board 27 are fed to the liquid crystal display panel 13 and to the liquid crystal display panel 11 by way of conductor wires 25, thus permitting a visual display of respective characters. Batteries 28 are accommodated within the housing 14, which connected to the control board 27 for power supply.

Figure 3:
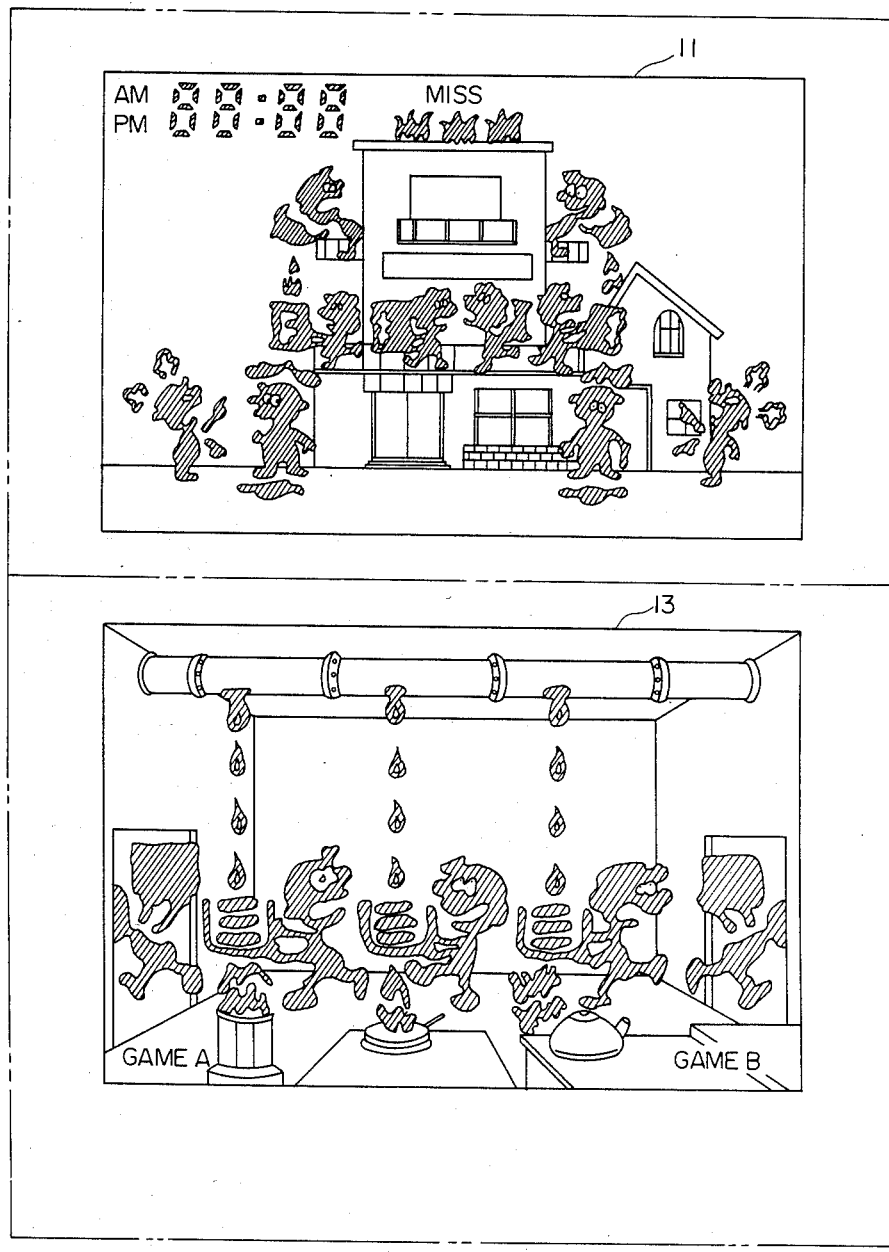
FIG. 3 is an illustration of an example of liquid crystal display panels as illustrated in FIGS. 1 and 2.

FIG. 3 shows a representative example of the liquid crystal display panels 11 and 13 as depicted in FIGS. 1 and 2. In FIG. 3, sections marked by hatching lines form display sections and character sections defined by transparent electrodes so that these characters are visually displayed in desired patterns upon application of an enabling voltage to the respective electrodes. The remaining display portions provide a background having a fixed pattern which may be embodied by any known technique, for example by printing or the like.

With reference to FIG. 3, the scheme of the illustrated example of games will be explained. The liquid crystal display panel 13 shows an inside of the third floor of a restaurant. The other liquid crystal display panel 11 shows the outside of that restaurant. Oil drops from somewhere in an oil pipe as indicated in the liquid crystal display panel 13 at all times. The sequence of the positions where oil leaks occur is selected at random, as will be discussed below. Catch men who bear buckets to catch oil leaking from the oil pipe are movable across the liquid crystal display panel 13 (shown in FIG. 3.) These catch men move in response to actuations of the above mentioned character shift switches 21 and 22. In other words, the catch men move left when the character shift switch 21 is actuated once and move right when the character shift switch 22 is actuated once, respectively, as viewed in FIG. 3. If a particular one of the catch men catches a drop of oil, then the level of the oil in the bucket carried by him increases and score points increase on the display panel. This score is displayed in a seven-segmented character pattern. An updated time of day may be displayed in this seven-segmented pattern in response to actuation of the time switch 24. On the other hand, if the catch man fails to catch oil drops the corresponding one of three burners on the liquid crystal display panel 13 will burst into flames and the marking "MISS" will show up on the liquid crystal display panel 11.

When it is desired to empty the oil out of a bucket carried by the catch man, the catch man should be moved to the extreme left or right position by actuation of either the switch 21 or 22 in order to empty the bucket through left or right window. At that time the catch man who is discharging the oil, is displayed on the liquid crystal display panel 11. If a "walk" man on the second floor catches the falling oil, then the score is increased on the display. The "walk" man moves left and right regularly on the display. However, if a "walk" man fails to receive the falling oil, then the liquid crystal display panel 11 will indicate together with the marking "MISS" a scene where the oil falls on passers-by. Another scene appears where those passers-by get angry. The game will be over as soon as the marking "MISS" is displayed three times.

FIG. 4 is a circuit block diagram of this embodiment. In this block diagram, central processing unit CPU 41 (typically, Z80 by Zilog) is supplied with a reference $\phi$ from a clock generator 42. A ROM 45 and a RAM 46 are connected to the CPU 41 via an address bus 43 and a data bus 44. The ROM 45 stores operational programs will be described below with reference to FIGS. 10 to 19 and the CPU 41 operates pursuant to these operational programs. The RAM 46 has storage regions as shown in FIG. 7, for example. Display data latches n0 to n17 and an input data latch n18 are also connected to the CPU 41 by way of the data bus 44. The RAM 46 and the latches n0 to n17 are supplied with a write control signal (WR) from the CPU 41, which signal determines its write timing and latch timing. Furthermore, the ROM 45, the RAM 46 and the latch 18 receives a read control signal (RD) from the CPU 41, which signal determines the readout timing and the latch timing.

The CPU 41 is further connected to an address decoder 47 via the address bus 43. A chip enabling signal (CE) from the address decoder 47 is fed to the ROM 45, the RAM 46 and the latches n0 to n18. Outputs specifying addresses U0 through Un from the address decoder 47 render the ROM 45 operable and outputs specifying addresses Y0 to Yn render the RAM 46 operable, with addresses n0 to n18 being assigned to the latches n0 to n18.

As stated above, the latches n0 to n17 are latches for display data and especially for latching display data indicative of groups of characters (see FIG. 8) on the liquid crystal display panels 11 and 13. The latch n18, on the other hand, is an input latch which receives a game start instruction, a time display instruction, a character left shift instruction and a character right shift instruction from the start switch 23, the time switch 24, and the character shift switches 21 and 22. The latch n18 is further supplied with a 1-sec clock signal $\phi 2$ from the clock generator 42. This 1-sec clock has a repetitive interval of 1 sec with reversal of its output level every 0.5 sec.

The display data latched in the latches n0 to n17 are fed to a display driver 48. The display driver 48 includes exclusive OR gates for a respective bit of the data latched in the latches n0 to n17.

FIG. 5 is an illustration such an exclusive OR gate. As seen from the drawings, the exclusive OR gate is supplied with a latch signal and a display clock signal $\phi 1$ from the clock generator 42. The exclusive OR gate, when the display clock signal $\phi 1$ and the latch signal disagree as shown in FIG. 6, provides a character enabling signal. The character enabling signal is fed to the corresponding of character on the liquid crystal display panel 11 or 13. The display clock signal $\phi 1$ from the clock generator 42 is further applied to the liquid crystal display panels 11 and 13, so that the corresponding character is visually displayed in response to the character enabling signal while the latch signal assumes a high level.

FIG. 7 is an illustration of storage regions of the RAM 46 and CPU 41 as shown in FIG. 4. The addresses Y0 to Y20 (hexadecimal numbers) are assigned respectively to every 8 bits of the RAM 46. The addresses Y0–Y11 out of the addresses Y0–Y20 are used as a register for storing the display data indicative of the respective character groups (see FIG. 8) on the liquid crystal display panels 11 and 13, while the remaining addresses Y12–Y20 are used as registers for storing various flags, for storing other data and as a timekeeping counter.

Figure 8:
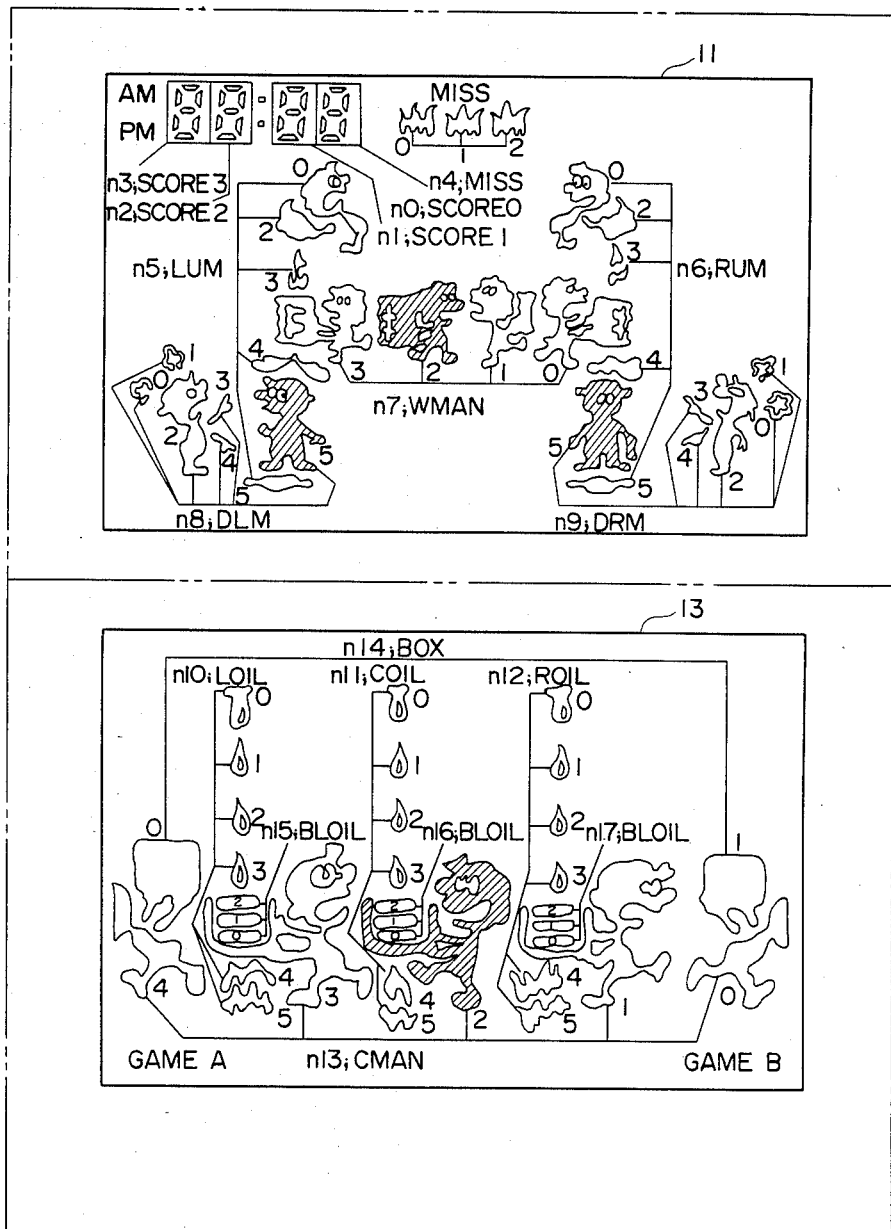
FIG. 8 is an illustration of the relationship between the display data registers at addresses Y0 and Y11 in FIG. 7 and of the characters on the liquid crystal display panels 11 and 13.

The relationship between the respective registers at the addresses Y0–Y11 as shown in FIG. 7 and the respective character groups on the liquid crystal display panels 11 and 13 are made clear by reference to FIG. 8. According to FIG. 8, the characters on the liquid crystal display panels 11 and 13 which have high relevance to each other are divided into several groups of characters. The respective one of the registers at the addresses Y0–Y11 in FIG. 7 store the display data in the character group bearing the same title as that of the register in FIG. 8. For example, WMAN at the address Y7 stores the display data indicative of the "walk" men on the liquid crystal display panel 11. CMAN at the address YD stores the display data indicative of the catch men on the liquid crystal display panel 13.

The respective one of the registers at the addresses Y1–Y11 comprises 8 bits beginning with (0)th bit as the least significant bit and ending with (7)th bit as the most significant bit. The respective one of the characters in the groups corresponds to any bit in the register storing its associated display data. Number suffixes to the respective characters in FIG. 8 indicate the corresponding bits. When it is desired to display any character in a particular group of the characters, a logic "1" signal is written into the corresponding bit of the register which stores the display data indicative of that particular character group. For example, assuming that display data "00001101" are written into RUM at the address Y6 (FIG. 7) and fed to the liquid crystal display panel 11 through the corresponding latch n6 and the display driver 48 (FIG. 4), three of five characters appear on the display whereby the first character is representative of the catch man (corresponding to (0)th bit), the second character is representative of the bucket (corresponding to (2)nd bit) and the last character is representative of the falling oil (corresponding to (3)rd bit), with none of the remaining characters (corresponding to (4)th and (5)th bits) on the display.

Following is an explanation of the respective storage regions at the addresses Y12–Y20. GAMEF at the address Y12 is used as a flag region for storing the progress of the game. KEYF at the address Y13 is used as a flag region for storing the kind of an actuated key and for indicating that the output of the 1-sec clock signal $\phi 2$ from the clock generator 42 of FIG. 4 rises. FIG. 9 is a schematic illustration of bit structures of GAMEF and KEYF as discussed above. It is evident from FIG. 9 that the (0)th bit of GAMEF in set state stores the termination of the game, (1)st bit in set state stores movement of the catch man to the extreme right on the liquid crystal display panel 13, (2)nd bit in set state stores movement of the catch man to the extreme left on the liquid crystal display panel 13, and (3)rd bit in set state stores right movement of the walk man on the display panel 11. In KEYF, (0)th bit in set state stores that the start switch 23 has been actuated, (1)st bit in set state stores that the character right shift switch 22 has been actuated, (2)nd bit in set state stores that the character left shift switch 21 has been actuated, and (3)rd bit in set state stores that the time key 24 has been actuated. Furthermore, (7)th bit in set state stores that the 1-sec clock signal $\phi 2$ has risen (see FIG. 4).

TM1 at the address Y14 is a region which stores as numerical information the speed of the oil leaking from the oil pipe. By varying the setting in TM1 according to the score, the falling speed of the oil and the traveling speed of the walk man are made variable. SCR01 at the address Y15 is a region storing the lower two digits of the game score, whereas SCR23 at the address Y16 is a region storing the upper two digits of the game score. TANK at the address Y17 is a region which stores the quantity of the oil in the bucket as a function of the number of oil drops caught by the catch man on the liquid crystal display panel 13 for displaying purposes. TMR at the address Y18 is used as a counter which counts the length of the display time when the right catch man on the liquid crystal display panel 11 (as included in the character group corresponding to RUM) empties oil out of a bucket. Likewise, TML at the address Y19 is used as a counter which counts the length of display time when the left catch man on the liquid crystal display panel 11 (as included in the character group corresponding to LUM) empties oil out of a bucket. TM2 at the address Y1A serves as a counter which counts the length of time when the walk man (WMAN) at the extreme left or right position of the liquid crystal display panel 11 reverses the movement direction and moves right or left on the display. TM3 at the address Y1B serves as a counter counting the length of time from the point where the walk man stands somewhere on the liquid crystal display panel 11 except at its extreme right or left to the point where it shifts in a desired direction. RAN at the address Y1C is a storage region where random values are set while the liquid crystal display panel 13 shows the oil leaking from the oil pipe, the setting values determining whether the oil will leak from the right side, middle or left side of the oil pipe.

TMS at the address Y1D is used as a second counter which steps every one second in response to the 1-sec clock $\phi 2$. TMM at the address Y1E is used as a minute counter which steps every 1 minute. TMH at the address Y1F is used as a hour counter which steps every 1 hour. KEYF1 at the address Y20 likewise KET at the address Y13 is used as an 8-bit flag region.

The CPU, as shown in FIG. 7, further includes 8-bit working registers A to E for various data and 16-bit working registers X and Y.

FIGS. 10 to 19 are flow charts for explaining the operation of the above illustrated embodiment. The operation of this embodiment will now be explained with reference to FIGS. 1 to 19.

Figure 10:
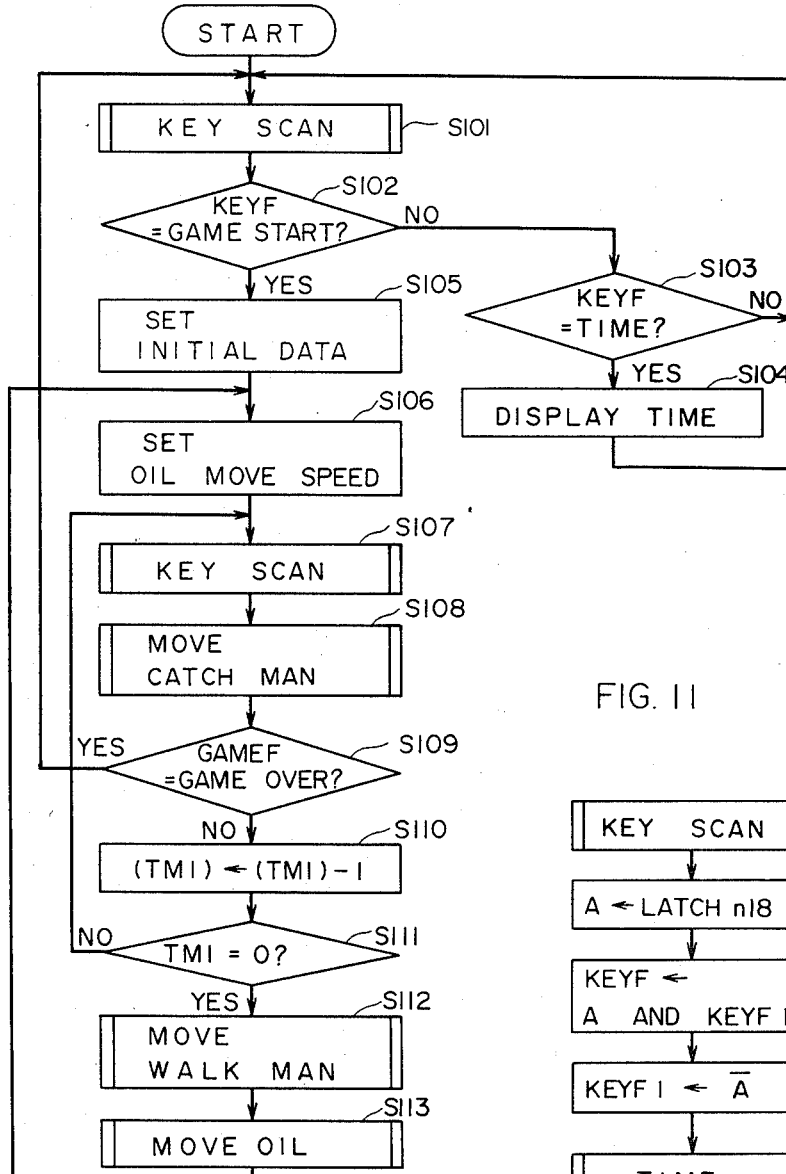
FIGS. 10 to 19 are flow charts for explaining the operation of an embodiment of the present invention.
Figure 11:
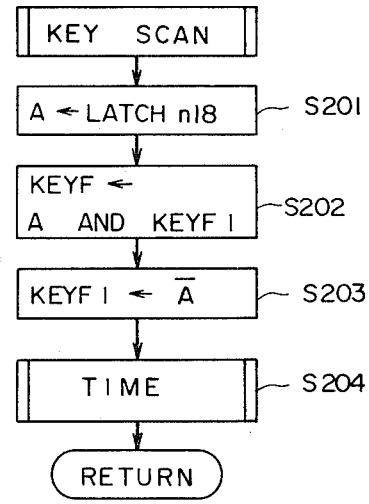

In step (referred to as "S" in the drawings) 101 in a main routine shown in FIG. 10, the rewriting of KEYF in the RAM 46 is effected in response to actuation of the switch or the leading edge of the output of the 1-sec clock signal $\phi 2$ from the clock generator 42. Subroutines of step 101 are illustrated in FIG. 11. Referring to FIG. 11, step 201 is to transfer the contents of the input latch n18 addressed at n18 by the address decoder 47 into the register A. In step 202, the contents of the register A and those of KEYF are OR'ed with the result being loaded into KEYF. This logic operation takes place every bit. In the succeeding step 203, KEYF1 is loaded with the reversed contents of the register A. Through the above described steps 201 to 203, the corresponding bit of KEYF receives "1" only when the respective one of the bits of the data in the input latch n18 changes from "0" to "1". Therefore, KEYF is rewritten only once even if the same switch remains actuated. The second counter TMS is updated every second since the contents of KEYF vary in response to the leading edge of the clock signal $\phi 2$ when the 1-sec clock signal $\phi 2$ is applied.

Figure 12:
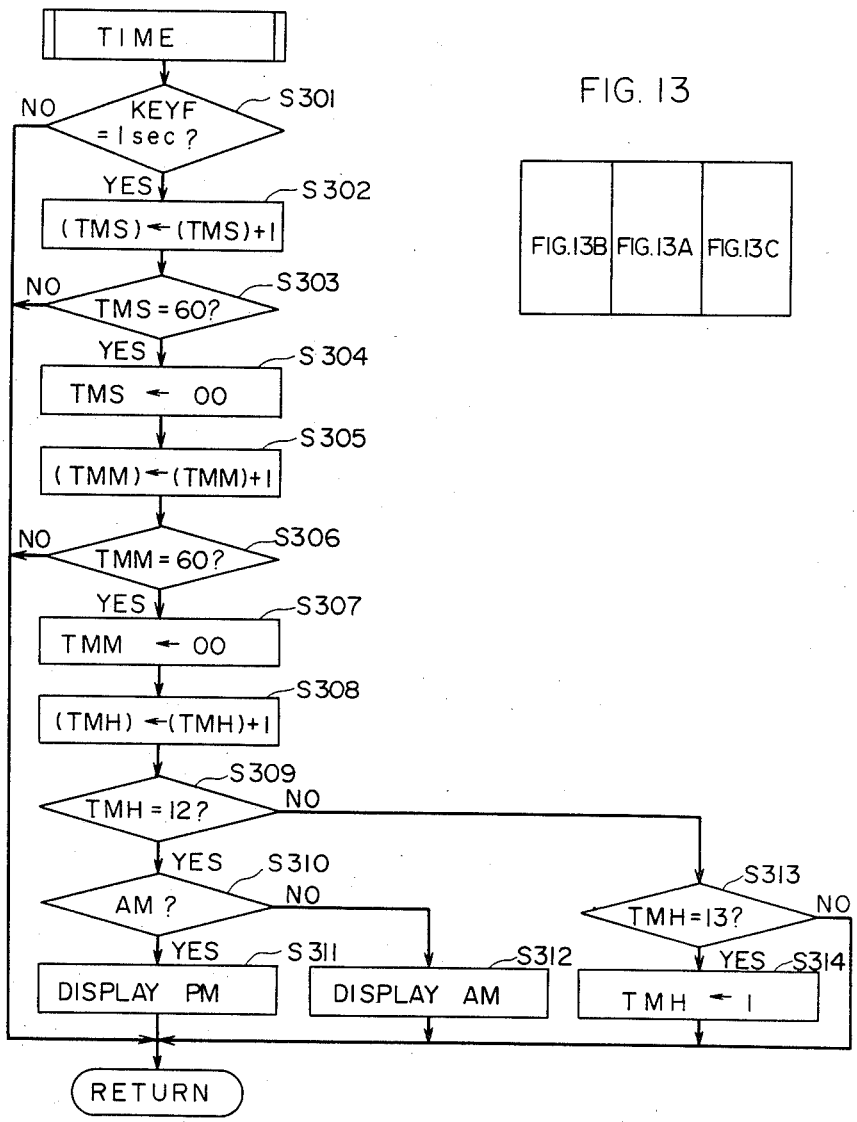

In the succeeding step a, timekeeping operation is carried out for displaying an updated time of day. There are subroutines of step 204 as shown in FIG. 12. These subroutines in step 204 in FIG. 11 will be discussed with reference to FIG. 12.

Step 301 in FIG. 12 decides if (7)th bit of KEYF (1 sec; see FIG. 9) is in a set state. As already discussed, the 1-sec clock signal $\phi 2$ which is to be applied to the latch n18 has a repetitive interval with the reversal of its output level every 0.5 sec. Having been set in response to only the leading edge of the 1-sec clock signal $\phi 2$, (7)th bit of KEYF is placed into the set state once every one second. If step 301 of FIG. 12 reveals that (7)th bit of KEYF has still not been set, then the process will return to the operational state as shown in FIG. 10 because one sec has not passed after the previous timekeeping operation. However, if step 301 finds (7)th bit of KEYF in a set state, then the second counter TMS is incremented by one during step 302 and a decision is made during step 303 whether the count of the second counter TMS reaches "60". Should step 303 conclude that the count of the second counter TMS is not "60", the process returns to the operational state of FIG. 10. On the other hand, if it is decided that the count of the second counter TMS has reached "60" and thus one minute has passed, then the second counter TMS will be cleared in step 304 and the minute counter TMM will be incremented by one in step 305. Step 306 decides if the count of the minute counter TMM has reached "60". The process will return to the operational state of FIG. 10 if the count of the minute counter TMM has not reached "60" yet. However, if the count of the minute counter TMM has reached "60", then the minute counter TMM will be cleared in step 307 and the hour counter TMH will be incremented by one because of an hour having passed. The succeeding step 309 determines if the count of the hour counter TMH has reached "12". In the case where the count of the hour counter TMH is 12, step 310 decides whether the time-of-day has to be displayed as "AM". If the time-of-day display is in the AM, step 311 changes from AM display to PM display. On the other hand, if it is not an AM display but a PM display, step 312 changes the display to a PM display. Should step 309 conclude that the count of the hour counter TMH has not reached "12", step 313 decides whether the count of the hour counter TMH is "13". The process will return to the operational state as illustrated in FIG. 11 when the count of the hour counter TMH is not "13", whereas step 314 replaces the counter of the hour counter TMH by one when the count of the hour counter TMH is equal to "13". Accordingly, the hour counter TMH begins timekeeping again with 1 o'clock.

Reverting to FIG. 10, after execution of step 101, step 102 decides whether (0)th bit of KEYF is in a set state, that is, if the start switch 23 has been depressed. If (0)th bit of KEYF is not in a set state, then step 103 decides whether (3)rd bit of KEYF is in a set state, that is, whether the time switch 24 has been actuated. In the event that (3)rd bit of KEYF is not in a set state, the process returns to step 101. However, with (3)rd bit of KEYF in a set state, the time-of-day is visually displayed in the seven-segmented character pattern on the liquid crystal display panel 11 during step 104.

When step 102 acknowledges that (0)th bit of KEYF is in a set state, step 105 achieves initial settings. The initial settings in step 105 involve clearing all of the contents of the RAM 46 except in the respective regions TMS, TMM, TMH, KEYF and KEYF1 having relevance to timekeeping, introducing the display data into desired ones of the display data registers within the display data registers at the addresses Y0 to Y11 and displaying desired characters (as defined by the hatching lines in FIG. 8.) When this occurs, numerical data "0" are read out from SCR01 and SCR23 and converted into the display data so that "00" is displayed on the liquid crystal display panel 11.

The next step 106 is to set the falling speed of the oil leaking from the oil pipe on the liquid crystal display panel 13 at a predetermined value. The falling speed of the oil is set in TM1 of the RAM 46 in such a manner as to increase with an increase in the score. In the initial state "100", for example, are preset in TM1. In the case where a particular score is displayed with the progress of the game, the value in TM1 is reduced by one every 20 points and by two every 100 points, respectively. Steps 107 to 111 are repeated by a number of times which corresponds to the setting in TM1. The oil shifts during step 113 following step 112. The oil moves from a particular position to another on the display. In other words, the length of time where the oil moves is regulated according to the number of repetitive executions of steps 107 through 111 which in turn is determined by the setting in TM1, thus controlling the falling speed of the oil.

Figure 13:
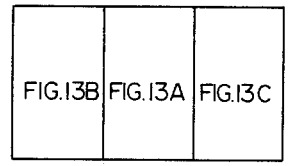
Figure 13B:
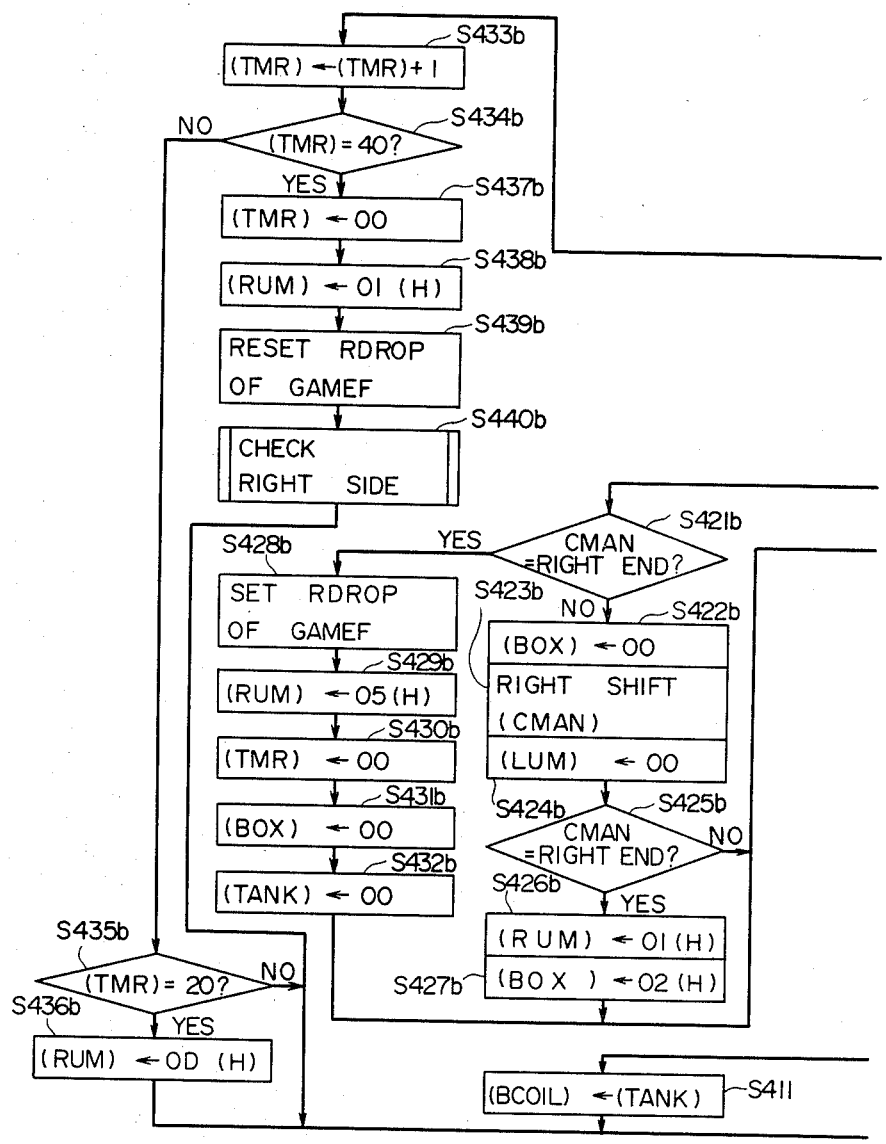
Figure 13C:
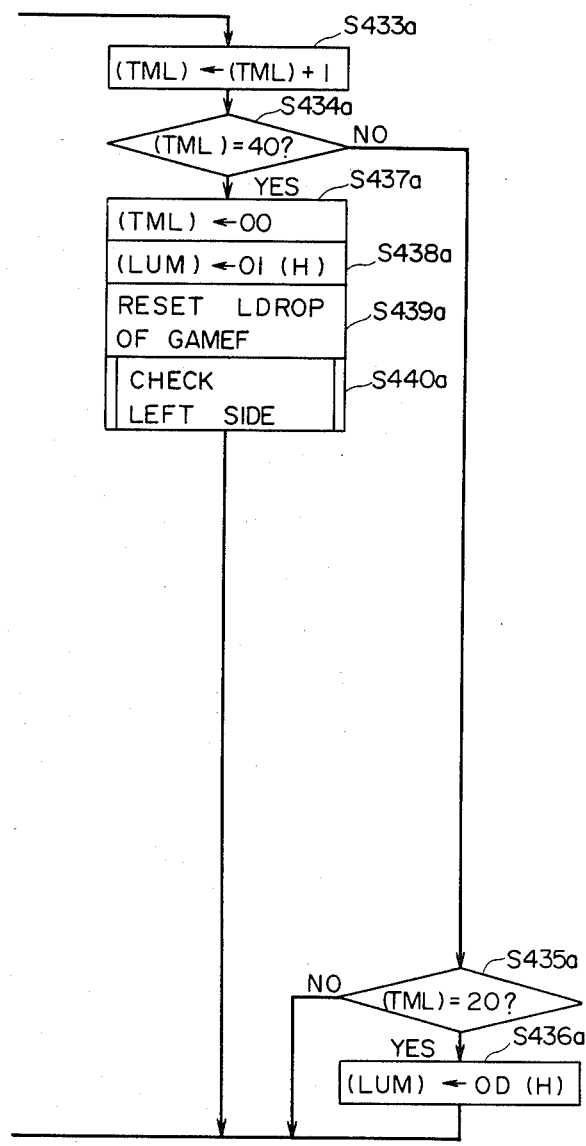

After execution of step 106, step 107 permits a program (KEY SCAN) to be carried out in the same manner as the above described step 101. Step 108 permits the catch man to move on the liquid crystal display panel 13. Subroutines is this step 108 are illustrated in FIG. 13. Details of step 108 will be explained with reference to FIG. 13. Upon depression of the character left shift switch 21 the process will proceed in the following manner. Whether the character left switch 21 has been depressed is determined by steps 401 and 402 followed by step 403. In other words, step 403 decides if the character left shift switch 21 has been actually depressed by determining whether (2)nd bit of KEYF of the RAM 46 is in a set state. Should (2)nd bit of KEYF be considered as being in a set state, step 412a decides whether the catch man moves to the extreme left on the liquid crystal display panel 13. This decision is made by determining whether (4)th bit of CMAN storing in the display data representative of the catch man on the liquid crystal display panel 13 assumes "1". Provided that the catch man has not moved to the extreme left, step 422a clears BOX storing the display data representative of the buckets carried by the left and right catch men on the liquid crystal display panel 13. In addition, during step 423a the display data representative of CMAN are shifted by one bit to the left in order to move the catch man to another position to the left. RUM is cleared in step 424a. The next step 425a decides whether the catch man has moved to the extreme left on the liquid crystal display panel 13. Provided that the catch man does not stand at the extreme left, step 405 clears BLOIL, step 406 clears BCOIL and step 407 clears BROIL. This results in clearing the display data in connection with the oil in the buckets carried by the left and right and middle catch men on the liquid crystal display panel 13. Thereafter, steps 408, 410 and 412 determine the position where the catch men should be displayed on the liquid crystal display panel 13 except at the extreme right or left. This decision is made by determining which of (1)st to (3)rd bits of CMAN assumes "1". If decisions during steps 408, 410 and 412 indicate that the catch man moves from the middle position to the left position on the liquid crystal display panel 13, then the contents of TANK storing the data representative of the quantity of the oil in the catch man's bucket are conveyed to BLOIL to step 409. If it is concluded that the catch man stands at the middle position, then step 411 will shift the contents of TANK to BCOIL. Furthermore, if the catch man is considered as standing at one position to the right of the middle position, then step 413 unloads TANK into BROIL. During the next step 414 the contents of the RAM 46 at the addresses Y0 to Y11 are supplied to the display driver 48 to the latches n0 through n17, thus enabling the liquid crystal display panels 11 and 13 to display desired characters.

In the case where the catch man is considered as having moved to the extreme left during the step 425a, step 426a is effected to place "01 (hexadecimal number)" into LUM. This completes the setting of a character corresponding to (0)th bit of LUM out of the character group (see FIG. 8) corresponding to LUM on the liquid crystal display panel 11 for display purposes. Step 427a further places "01" (hexadecimal number: herein-after referred to as "H") into BOX. As a result, setting of the left bucket is completed out of the character group corresponding to BOX on the liquid crystal display panel 13 for displaying purposes. Display is effected by step 414 following the above mentioned steps 405 to 407, 408, 410 and 412. In this mode of display, the characters already set through the above steps 426a and 427a appear on the display, indicating the behavior of the catch man immediately before he discharges oil out of the window on the third floor.

The operational events in the case where the catch man is considered as having moved to the extreme left of the liquid crystal display panel 13 during step 421a will now be described. Step 428a places (2)nd bit of GAMEF into a set state which in turn memorizes that the oil has been discharged by the catch man on the extreme left. In the following step 429a, "05 (H)" is placed into LUM and the characters corresponding to (0)th bit and (2)nd bits of LUM are set out of the character group corresponding to LUM in FIG. 8 for display purposes. In the following step 430a, the counter TML is cleared which counts the length of time where the left catch man on the liquid crystal display panel 11 throws away the oil and in step 431a BOX is cleared. IN addition, TANK is cleared in step 432a.

Since (2)nd bit of GAMEF is set during the above step 428a, this fact is envisaged in step 401. TML is incremented by one in step 433a. To see if a predetermined time has gone by, step 434a decides whether the count of TML has reached "40". If the count of TML has not reached "40" yet, step 435a decides whether the count of TML has already reached "20". If the count of TML is less than "20", the above described step 414 performs a display operation. On the other hand, if the count of TML is equal to "20", step 436a places "OD (H)" into LUM. By setting into LUM, the characters corresponding to (0)th, (2)nd and (3)rd bits of LUM are set out of the character group corresponding to LUM in FIG. 8 for displaying purposes. The liquid crystal display panel 11 in step 414, therefore, shows that the left side catch man is discharging the oil.

If the above step 434a concludes that the count of TML has reached "40", TML is cleared in step 437a and "01 (H)" is set in LUM in step 438a. In step 439a, (2)nd bit of GAMEF is reset. The next step 440a checks whether the walk man on the second floor of the restaurant catches the oil discharged by the left side catch man on the liquid crystal display panel 11. Subroutines in step 440a for checking are illustrated in FIG. 14A.

Figure 14A:
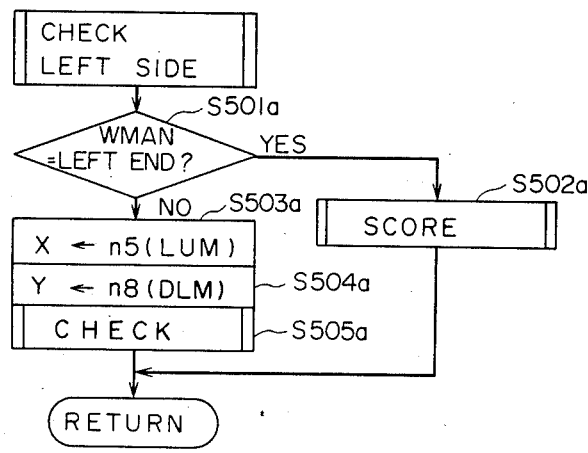
Figure 15:
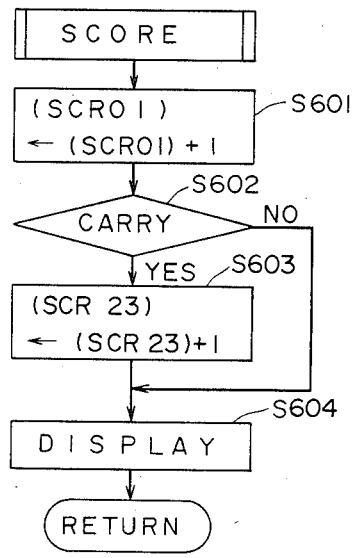
Figure 16:
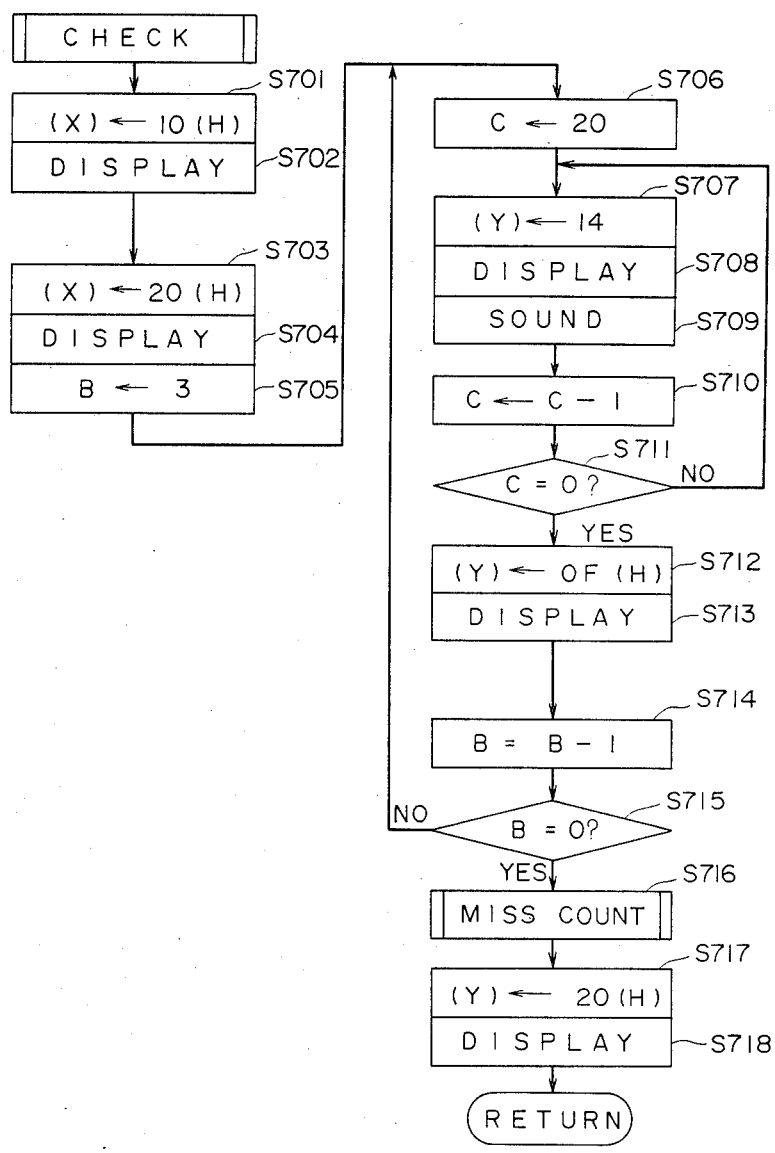

Step 501a in FIG. 14A decides whether the walk man on the second floor restaurant has moved to the extreme left on the liquid crystal display panel 11. In other words, a decision is made whether (4)th bit of WMAN assumes "1". As long as the walk man has moved to the extreme left, the walk man is considered as having "received" the oil so that a score is added in step 502a. Subroutines of this step 502a are depicted in FIG. 15. Contrarily, if the walk man has not moved to the extreme left, this means that he has failed to "receive" the falling oil. It follows that the latch n5 with an address n5 corresponding to LUM is loaded into the register X in step 503a and the address n8 of the latch n8 corresponding to DLM is loaded into the register Y in step 504a. Step 505a displays the scenes where the passers-by are caught by the oil and get angry and counts the number of MISS. This step 505 has subroutines as illustrated in FIG. 16.

The following will describe details of the subroutines of step 502a in FIG. 14A, with reference to FIG. 15. In step 601, SCR01 storing the lower two digits of the game score is increased by one. Step 602 decides whether there is a carry from SCR01. While in the absence of such a carry step 604 is immediately executed, in the presence of the carry SCR23 storing numerical data in the upper two digits of the score is increased by one in step 603, and step 604 follows which converts the numerical data of the score as stored in SCR01 and SCR23 into data appropriate for display and displays the same in the seven-segmented character pattern on the liquid crystal display panel 11.

Subroutines of step 505a in FIG. 14A will be described in detail with reference to FIG. 16. In step 701 in FIG. 16, the display data "10 (H)" are transferred into the latch which has been unloaded into the register X in step 503a in FIG. 14A. That is to say, the display data are transferred into the latch n5 corresponding to LUM. A display operation is performed in step 702 by which the character corresponding to (4)th bit of LUM is displayed out of the character group corresponding to LUM. In the following step 703, display data "20 (H)" are transferred into the latch n5 and a display is performed in step 704. In this mode of display, the character corresponding to (5)th bit of LUM is displayed out of the character group LUM. "3" is set in the register B in step 705, and "20" is set in the register B in step 706. In step 707, display data "14 (H)" are shifted to the latch the address of which has been loaded into the register Y in step 504a in FIG. 14A. In other words, the display data are transferred into the latch n8 corresponding to DLM. A display is further performed in step 708 by which the characters corresponding to (2)nd and (4)th bits of DLM are displayed out of the character group DLM. Then, a buzzer (not shown) is energized in step 709. The buzzer made of a small-sized piezoelectric type buzzer and is disposed in the housing 12 or 14 shown in FIG. 1. The scene where the passers-by get angry as displayed on the liquid crystal display panel 11 is exaggerated by energizing the buzzer. Step 710 decreases the register C by one and step 711 checks whether the count in the register C is "0". If the count in the register C is not "0", the above steps 707 and 710 are repeated.

Figure 17:
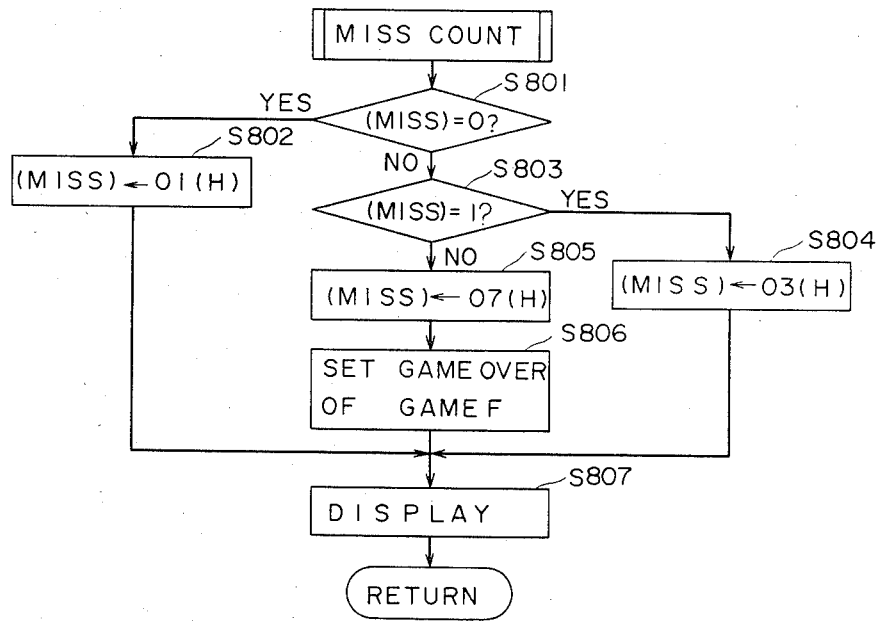

If the count of the register C is "0", display data 0F (H) are transferred into the latch the address of which has been loaded into the register Y in step 712. Since the address of the latch n8 corresponding to DLM has been loaded into the register Y in step 504a as shown in FIG. 14A, the display data are transferred into the latch n8. In the next step 713a display is performed by which (0)th, (1)st, (2)nd and (3)rd bit characters are displayed out of the characters group DLM. The register B is decreased by one in step 714 and whether the count in the register B is reduced to "0" is determined in step 715. If the count in the register B is not "0", then the above steps 706 to 714 are repeated. By repeatedly executing the steps 706 to 714, the liquid crystal display panel 11 shows the scene where the passers-by get angry with swinging arms. When the count in the register B reaches "0", step 716 counts the number of MISS. Subroutines of step 716 are illustrated in FIG. 17. In the next step 717, display data "20 (H)" are fed to the latch n8 the address of which has been set in the register Y and a display is performed in step 718 by which the (5)th bit character is displayed on the liquid crystal display panel 11 out of the character group DLM.

The subroutines of step 716 as shown in FIG. 16 will be discussed in further detail with reference to FIG. 17. Step 801 decides whether the display data MISS are "0", in other words whether the number of MISS up to now during the game is "0". If the number of MISS is "0", then step 802 places display data "01 (H)" into MISS which is then displayed in step 807. Under these circumstances, (0)th bit character appears on the liquid crystal display panel 11 out of the character group MISS. However, when step 801 reveals that the number of MISS is not "0", then step 803 decides whether (0)th bit of the MISS number is "1" to see whether the number of MISS is "1" up to now. When the number of MISS is "1" step 804 places display data "03 (H)" into MISS and step 807 displays the data. At this moment (0)th and (1)st bit characters are visually displayed out of the character group MISS. Should step 803 show that the number of MISS is not "1", display data "07 (H)" are placed into MISS in step 805 and (0)th bit of GAMEF is placed into set state in step 806. This procedure memorizes that the game is over. A display is thereafter performed to display all of the characters in the group MISS in step 807.

Figure 14B:
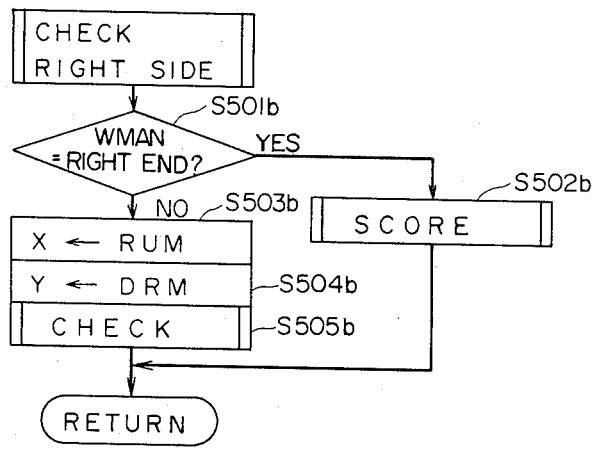

The operational events when the character left shift switch 21 is actuated and those when (2)nd bit of GAMEF is considered as being in a set state have been described by reference to FIGS. 13, 14A, 15, 16 and 17. It will be understood that operational events when the character right shift switch 22 is actuated and those when (1)st bit of GAMEF is determined as being in set state are performed in direction opposite to that in the foregoing description. Such operational events will be readily understood because the only differences are in the various registers and the addresses of the various flags to be processed. Operational steps similar to those described previously will not be described herein, wherein the former are represented by the same reference numbers with suffix b. It is to be noted that operational events shown in FIG. 14B are conducted instead of those in FIG. 14A in step 440b corresponding to the above step 440a.

Figure 18:
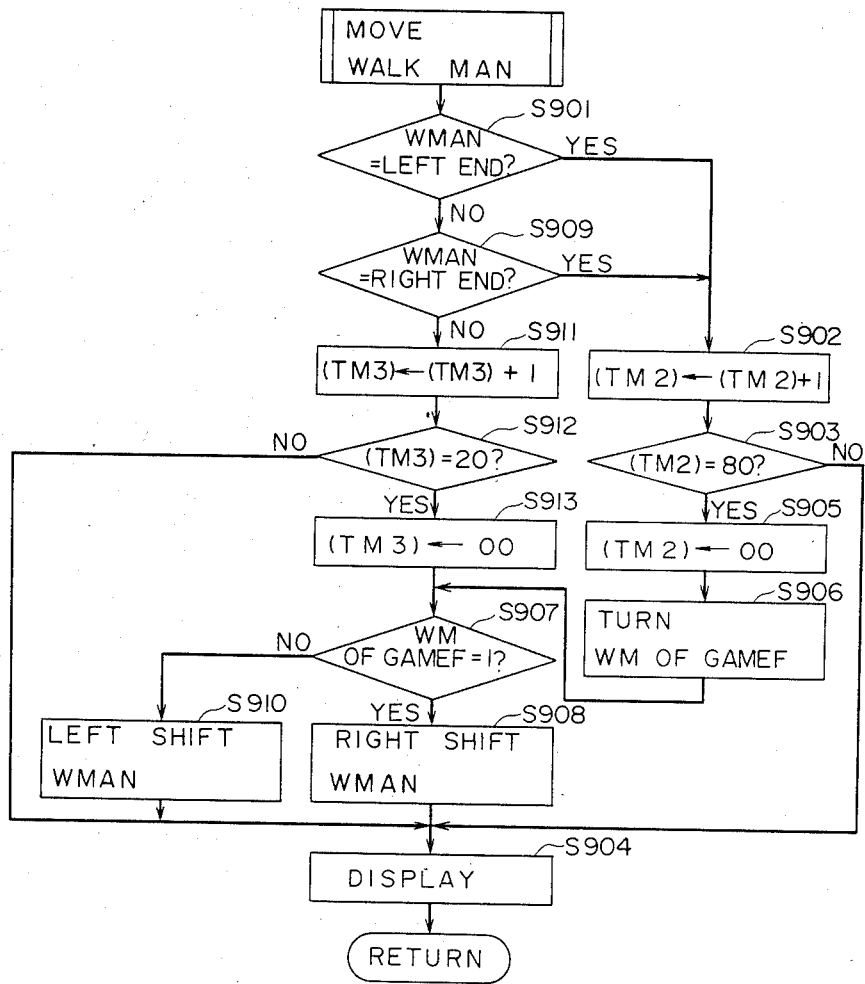

Referring again to the flow chart of FIG. 10, step 109 following step 108 decides whether (0)th bit of GAMEF is in a set state and, in other words if, whether the game is over. Once the game is over the process returns to step 101. Otherwise, TM1 is decreased by one in step 110 and a decision is made in step 111 whether the count of TM1 is "0". This procedure is to control the falling speed of the oil on the liquid crystal display panel 13. If the count of TM1 is not "0", then steps 107 to 110 are executed again. On the other hand, if the count of TM1 is "0", then step 112 governs movement of the walk man on the liquid crystal display panel 11. Subroutines of step 112 are illustrated in FIG. 18. Referring to FIG. 18, the following will set forth the situation where a walk man has moved to the extreme left of the liquid crystal display panel 11. Step 901 decides that a walk man has moved to the extreme left and step 902 increased TM2 by one. Step 903 checks whether the count of TM2 is "80". If the count of TM2 is not "80", then step 904 causes a display and the apparatus returns to the operational events as illustrated in FIG. 10. The steps 901 through 904 are repeated until the count of TM2 reaches "80". Once the count of TM2 has reached "80", step 905 clears TM2. In step 906, (3)rd bit of GAMEF is inverted. (3)rd bit of GAMEF is a flag representative of the direction of movement of the walk man and in this case inverted from a reset to a set state.

This inversion is sensed in step 907 and display data in WMAN storing display data indicative of the walk man are shifted right in step 908. During step 904 the walk man moves right from the extreme left to another position.

Operational events when the walk man has moved to the extreme right of the liquid crystal display panel 11 will now be discussed. This situation is confirmed in step 909 and steps 902 to 904 are executed in a similar manner. If step 903 reveals that the count of TM2 is "80", (3)rd bit of GAMEF changes from a set to a reset state in step 906 following step 905. Step 907 confirms this change and step 910 permits the display data in WMAN to be shifted left. As a result, the walk man moves left from the extreme right to another position.

In the case where the walk man stands anywhere on the liquid crystal display panel 11 except at the extreme left or right, TM3 is increased by one in step 911. Step 912 checks whether the count of TM3 has reached "20". If the count of TM3 is not "20", then step 904 is executed. But if the count of TM3 is "20", TM3 is cleared in step 913. The step 907 decides whether (3)rd bit of GAMEF is in a set state and display data in WMAN are shifted left or right depending upon this decision.

In the flow chart of FIG. 18, the display is until the count of TM2 reaches "80" in the case where the walk man has moved to the extreme left or right. On the other hand, in the case where the walk man has not moved to the extreme left or right yet, the display is maintained until the count of TM3 reaches "20". In other words, the length of time when the walk man is displayed on the extreme left or right is selected to be four times as long as that where the middle two walk men are displayed.

Figure 19:
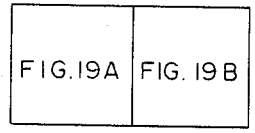
Figure 19A:
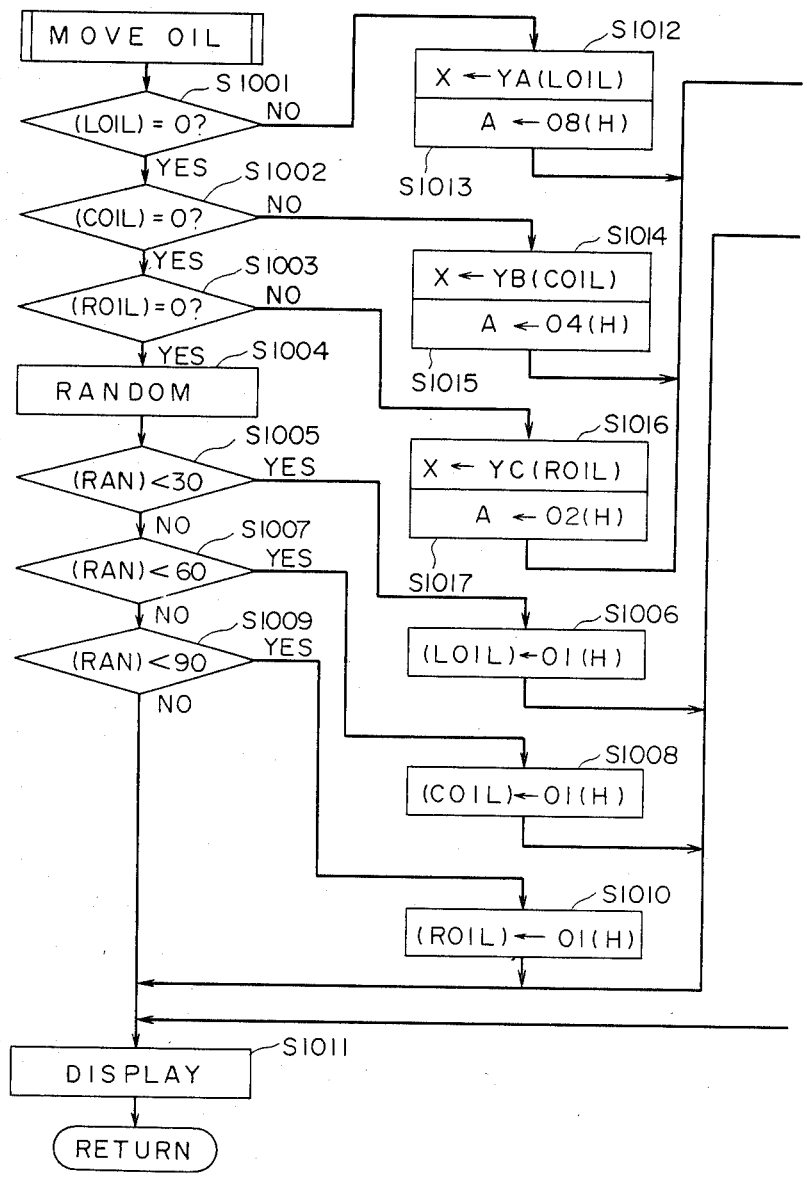
Figure 19B:
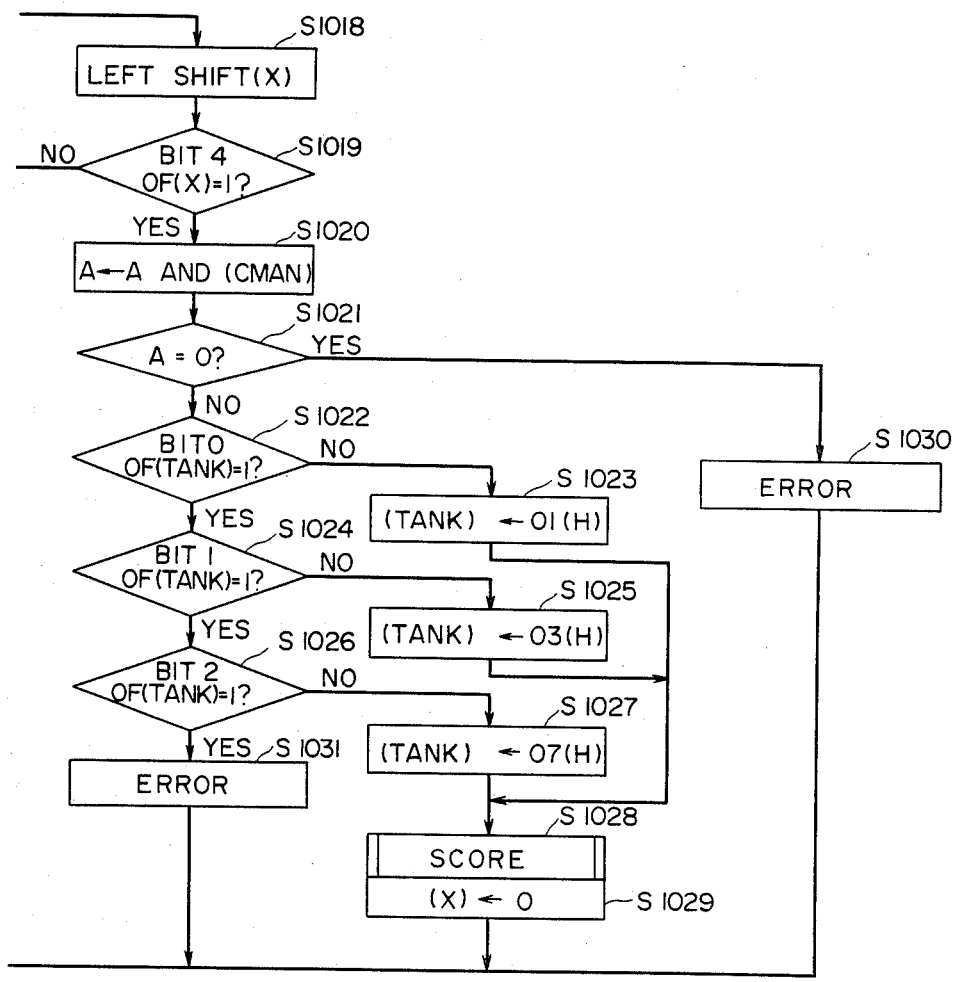

Returning to FIG. 10, step 113 following step 112 controls the visual display of the oil leaking from the oil pipe on the liquid crystal display panel 13. Subroutines of step 113 are illustrated in FIG. 19.

Operational events when the oil does not leak from the oil pipe on the liquid crystal display panel 13 will be discussed with respect to FIG. 19. In this case, LOIL storing display data representative of oil on the left side of the liquid crystal display panel 13, COIL storing display data representative of oil on the center portion, and ROIL storing display data representative of oil on the right side are all zeros. This situation is envisaged by steps 1001, 1002 and 1003, and step 1004 is executed in which a particular number is fetched at random in a range from "0" to "120" and loaded into RAN. Steps 1005, 1007 and 1009 decide whether the number in RAN is from "0" to "30", from "30" to "60", and "60" to "90", respectively. If the setting in RAN is from "0" to "30", then display data "01 (H)" are placed into LOIL in step 1006. If the setting in RAN is from "30" to "60", then display data "01 (H)" are placed into COIL in step 1008. And, if the setting in RAN is from "60" to "90", then display data "01 (H)" are placed into ROIL in step 1010. display is performed in step 1011. The (0)th bit character is displayed with respect to oil, out of one of the character groups LOIL, COIL and ROIL. The reason why any one of the oil drops falls from either the left, middle or right side of the liquid crystal display panel 13 depending upon the setting value placed at random in RAN is, that the oil should not be falling with any regularity. As a result, the user can not foresee at all the position where the oil will drip from the oil pipe and can thus enjoy an interesting and thrilling games. In the event that the setting value in RAN is over "90", no display data are placed into LOIL, COIL and ROIL so that display in step 1011 is performed.

For example, when display data are set in LOIL in step 1006, this fact is made sure in step 1001 wherein the oil movement is controlled. In step 1012 the address YA of LOIL is introduced into the register X. In step 1013, data "08 (H)" are loaded into the register X. It is noted that the data in the register A are the same as as those when the catch man at one position to the right of the extreme left is displayed on the liquid crystal display panel 13. To move the oil on the display, the display data in LOIL the address YA of which is specified by the register X are shifted left by one bit in step 1018. Step 1019 decides whether (4)th bit of LOIL as specified by the register X is "1", that is, whether the oil drop falls down as low as it can. If the answer is negative, a display is performed in step 1011. However, if the oil has fallen to the lowest possible level, then the contents of the register A and the contents of CMAN storing the display data regarding the catch man are OR'ed on a bit-by-bit basis, with the results being loaded into the register A as a logic sum. In the case where the catch man is displayed in the position where he can catch the left oil drop on the liquid crystal display panel 13 under these circumstances, CMAN stores the respective display data "08 (H)". When the data in the register A agree with the display data in CMAN, the catch man was able to catch the falling oil and the result of the logic sum is "08 (H)". But if the register A and CMAN disagree, then this means that the catch man was unable to catch the falling oil, with the result that the logic sum is "0". Step 1021 decides whether the contents of the register A loaded with the result of the logic sum are "0", that is, whether the catch man was able to catch the falling oil. In the case where the contents of the register A are not "0" and it is concluded that the catch man was able to catch the falling oil, step 1022 seeks to see whether (0)th bit of TANK storing the quantity of the oil caught by the catch man is (1). When (0)th bit of TANK is not (1), quantity data (=display data) "01 (H)" are placed into TANK in step 1023. Contrarily, when (0)th bit of TANK is (1), step 1024 sees whether (1)st bit of TANK is (1). When (1)st bit of TANK is not (1), step 1025 places quantity data "03 (H)" to load (1) at (0)th and (1)st bits of TANK. But when (1)st bit of TANK is (1), step 1026 checks if (2)nd bit of TANK is (1). Whether (2)nd bit of TANK is not (1), step 1027 places quantity data "07 (H)" into TANK in order to load (1) into (0)th, (1)st and (2)nd bits of TANK. After execution of steps 1023, 1025 and 1027, step 1028 (see FIG. 15) increases the score and displays the same in the seven-segmented character pattern on the liquid crystal display panel 11. Thereafter, the register X is cleared in step 1029.

If step 1021 concludes that the contents of the register A are (0), that is, that the catch man was unable to catch the falling oil, step 1030 is executed so that characters representative of flames beneath the dropped oil (for example, (4)th and (5)th bit characters in the character group LOIL) blink on the display and the number of MISS is counted and displayed as shown in FIG. 17. Similarly, if it is concluded in step 1026 that (2)nd bit of TANK is not (1), step 1031 is carried out so that the flames blink on the display and the number of MISS is counted and displayed. In other words, in the case where the catch man's bucket is full of oil, MISS is counted even if the catch man receives the falling oil.

If step 1002 decides that the display data in COIL are all zeros, the address YB of COIL is placed into the register X in step 1014 and data "O4 (H)" are placed into the register A in step 1015. It is noted that the data to be placed into the register A are the same as the display data when the catch man is displayed at the position for catching the middle oil drop on the liquid crystal display panel 13. Operational events occur in a similar manner. If step 1003 concludes that the display data in ROIL are not all zeros, the address YC of ROIL is placed into the register X in step 1016 and data "02 (H)" are placed into the register A in step 1017. The data to be placed into the register A are the same as the display data when the catch man is displayed at the position for catching the right side oil drop on the liquid crystal display panel 13. Operational events similar to those described above occur. After completion of the flow as illustrated in FIG. 19, the operational events following step 106 as in FIG. 10 are repeated until the game is over.

Figure 20A:
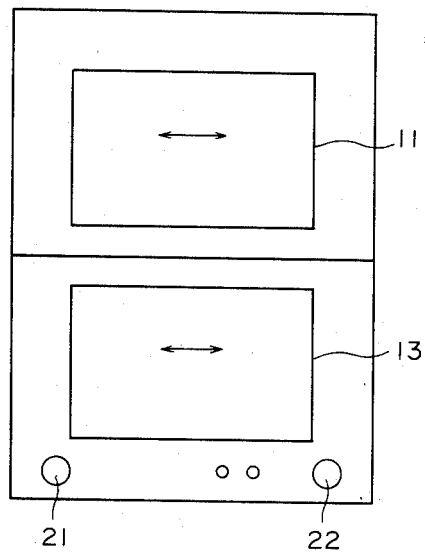
FIGS. 20A to 20F are illustrations of various modifications in the character shift switches and of characters moved by actuation of the character shift switches.
Figure 20B:
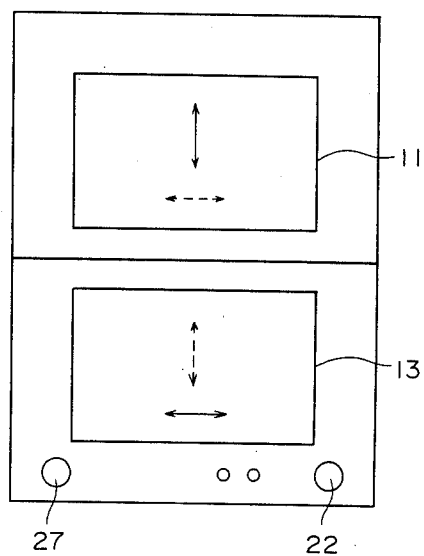

FIGS. 20A to 20F show a variety of modifications in the character shift switches and the characters moved and controlled by the shift switches. In FIG. 20A, desired ones of the characters are moved in the same direction on the liquid crystal display panels 11 and 13 in response to actuation of the character shift switches 21 and 22. In another example of FIG. 20B, desired ones of the characters are moved in crossing directions on the liquid crystal display panels 11 and 13 in response to actuation of the character shift switches 21 and 22. Especially, in the examples of FIGS. 20A and 20B, the desired characters are moved on the liquid crystal display panels 11 and 13 at the same time in response to actuation of the character shift switches 21 and 22.

Figure 20C:
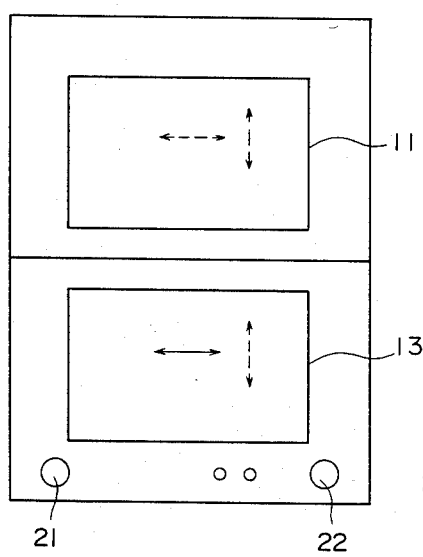

In the example of FIG. 20C, desired characters are moved in a horizontal direction or vertical direction on any one of the liquid crystal display panels 11 and 13 in response to actuation of the character shift switches 21 and 22. If a certain condition is met with the progress of the game (for example, when the character is moved to the edge position or the score excees a given value), desired ones of the characters are moved in a horizontal direction or vertical direction on the remaining liquid crystal display panel in response to actuation of the character shift switches 21 and 22. To put the above mode of control into practice, there are provided on the RAM area of the microcomputer a region for storing data for the liquid crystal display panel 11 and a region for storing data for the liquid crystal display panel 13 as well as a flag storing whether a certain condition of the game is met. Depending upon whether the flag is in a set or a reset state, the data storage region in the RAM is switched which affects an actuation of the character shift switches 21 and 22.

Figure 20D:
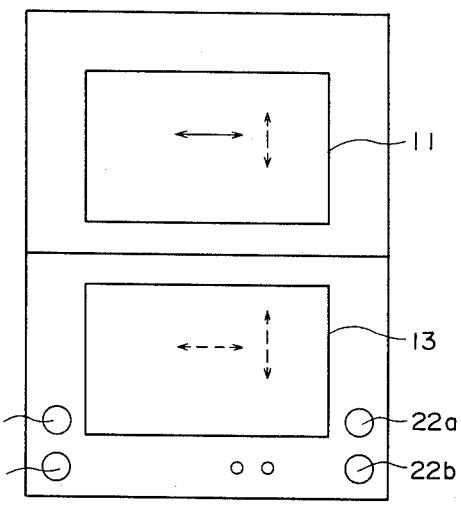

In the example of FIG. 20D, desired ones of the characters are moved in a horizontal direction on any one of the liquid crystal display panels 11 and 13 in response to actuation of character shift switches 21a and 22a. Furthermore, in response to actuation of the character shift switches 21b and 22b, desired one of the characters are moved in a vertical direction on any one of the liquid crystal display panels 11 and 13. In other words, in the example of FIG. 20D, the character shift switches 21a and 22a are used as character horizontal shift switches and the character shift switches 21b and 22b as character vertical shift switches.

Figure 20E:
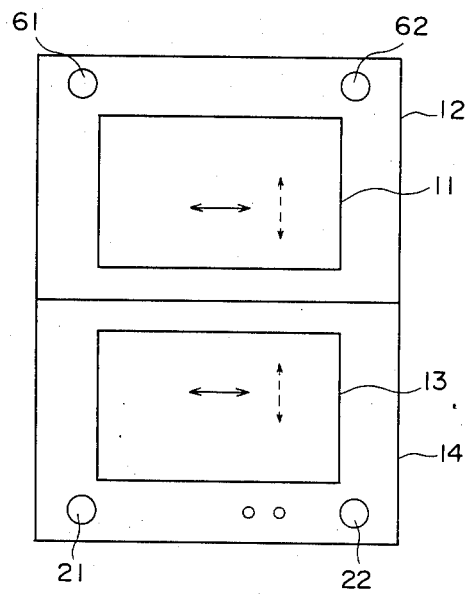
Figure 20F:
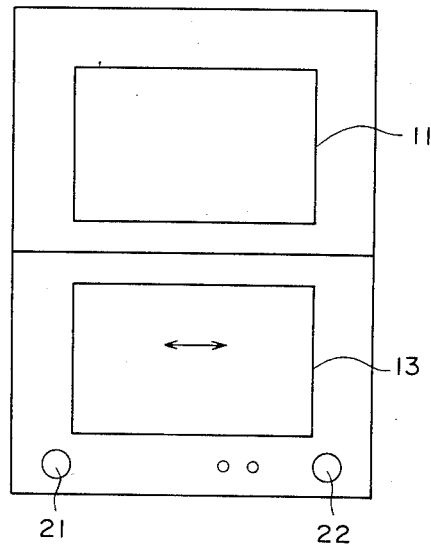

In the example as shown in FIG. 20E, there are disposed the character shift switches 21 and 22 in the housing 14 accommodating the liquid crystal display panel 13 and character shift switches 61 and 62 in the housing 12 accommodating the liquid crystal display panel 11. In response to actuation of the character shift switches 21 and 22, desired ones of the characters are moved in a horizontal direction or vertical direction on the liquid crystal display panel 13. Furthermore, in response to the actuation of the character shift switches 61 and 62, desired ones of the characters are moved in a horizontal direction or vertical direction on the liquid crystal display panel 11. In other words, in the example of FIG. 20E, the character shift switches are provided for each of the respective liquid crystal display panels. The example of FIG. 20F shows the mode of operation in the embodiment as illustrated in FIGS. 1 through 19. Desired ones of the characters are moved in a horizontal direction on the liquid crystal display panel 13 in response to actuation of the character shift switches 21 and 22. In the embodiment as shown in FIGS. 1 through 19, the mode of display on the liquid crystal display panel is varied when the desired ones of the characters have been moved to the edge position.

Figure 21:
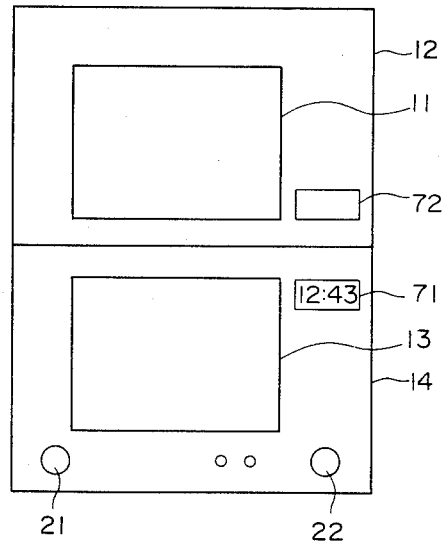
FIG. 21 is an illustration of another embodiment of the present invention.

FIG. 21 shows another embodiment of the present invention in which a time-of-day display region 71 is disposed separately from the position in the housing 14 where the liquid crystal display panel 13 is received. A transparent region 72 made of a transparent material such as glass or plastic is disposed at the position which faces against the time-of-day region 71 when the game apparatus is folded. In the embodiment of FIG. 21, time-of-day can be seen even when the housings 12 and 14 are in folded position. It is clear that the time-of-day region 71 may be used to show the game score.

To secure the advantages as in FIG. 21, the housing in which the remaining liquid crystal display panel having no time-of-day region is accommodated, is made of a transparent material or the remaining liquid crystal display panel may be set up in a liquid crystal display panel whose characters become transparent when being disabled.

Whereas in the embodiment shown in FIGS. 1 to 19, the characters are kept displayed even when the game apparatus is closed, these characters may be all extinguished for power saving when the game apparatus is in closed position. Since in this case of CPU 41 should always be energized for the timekeeping function, there is disposed on the housings 12 and 13 a switch which senses whether the game apparatus is closed or not and which shuts off the display clock signal $\phi 1$ to be supplied to the liquid crystal display panels 11 and 13 when the housings are open.

For the game apparatus in which the character shift switches are provided for each of the liquid crystal display panels as shown in FIG. 20E, individual game score regions may be provided in the respective liquid crystal display panels for individual displays of scores.

Whereas in the above embodiments the two liquid crystal display panels are foldable, it is further clear that three or more liquid crystal panels may be hinged to one another to be foldable.

Furthermore, in the foregoing embodiments, the character displays are set up by the liquid crystal display panels. Other power-saving display means typically electrochromic displays are also available as the display panels.

Although the present invention has been described and illustrated in detail, it is to be understood that the same is by way of illustration and example only and is not to be taken by way of limitation, the spirit and scope of the present invention being limited only by the terms of the appended claims.

What is claimed is:

1. A hand-held game apparatus, for playing games each having a plurality of different game aspects, comprising, a plurality of display panels each including controllable display characters for displaying on each panel a different game aspect of the same game, an extendable and foldable housing of a hand-held size including a plurality of housing portions rotatably coupled to each other for closing and opening said housing portions, whereby the closed housing is also of said hand-held size, each housing portion supporting one of said plurality of display panels, each of said plurality of display panels being disposed on its respective housing portion so that the display surfaces of said plurality of display panels may appear on one face of said housing when said housing is in an open position, whereby it is possible for a player observing the unfolded game apparatus to see with a single look all unfolded panel sections simultaneously to enable the player to ascertain that the different panel sections display said different game aspects of said same game, game operation means provided on at least one of said plurality of housing portions for manual operation by a player for playing said same game, and control means provided on at least one of said plurality of housing portions and responsive to a manual operation of said game operation means for controlling the display of said display characters of said plurality of different aspects of said same game for playing said same game on said plurality of display panels in a coordinated manner, whereby the manner of display of said different game aspects on said plurality of display panels is controlled by said control means so that each of said plurality of display panels cooperates with any other of said display panels to enable coordinating the playing of said same game.

2. The hand-held game apparatus of claim 1, wherein each of said display panels has a display surface area which is smaller than a surface area of the respective housing portion, whereby a frame portion is formed around each display panel for separating said display panels from each other.

3. The hand-held game apparatus of claim 1, wherein said display panels comprise liquid crystal display means.

4. The hand-held game apparatus of claim 1, wherein said housing comprises a connecting section for rotatably connecting said plurality of housing portions, said connecting section comprising bendable electric connecting conductor means for electrically connecting said control means with each of said display panels.

5. The hand-held game apparatus of claim 4, wherein said display panels comprise liquid crystal display means.

6. A hand-held game apparatus, for playing games each having a plurality of different game aspects, comprising a plurality of display panels each including controllable display characters for displaying on each panel a different game aspect of the same coordinated game, a housing of hand-held size comprising a plurality of housing sections and hinge means operatively interconnecting said housing sections for folding and unfolding the housing section between a closed position and an open position whereby the closed housing is also of said hand-held size, each housing section carrying one of said display panels, whereby it is possible for a player observing the unfolded game apparatus to see with a single look all unfolded panel sections simultaneously to enable the player to ascertain that the different panel sections display said different game aspects of said same game, game operation means provided on at least one of said housing sections for manual operation by a player for playing said same game, control means in at least one of said housing sections and operatively connected to said game operation means and to said display panels for controlling in a coordinated manner the display of said display characters of said plurality of different game aspects of said same game for playing said same game on all of said display panels simultaneously in response to a manual actuation of said game operation means, whereby all the display panels cooperate in displaying said different game aspects of the same coordinated game, and bendable electrical conductor means for electrically connecting said control means and each of said display panels for playing said coordinated game on all panels.

7. The hand-held game apparatus of claim 6, wherein each of said display panels has a display surface area which is smaller than a surface area of the respective housing section, whereby a frame portion is formed around each display panel for separating said display panels from each other, especially along said hinge means.

* * * * *